ated Feb. 3, 1914.

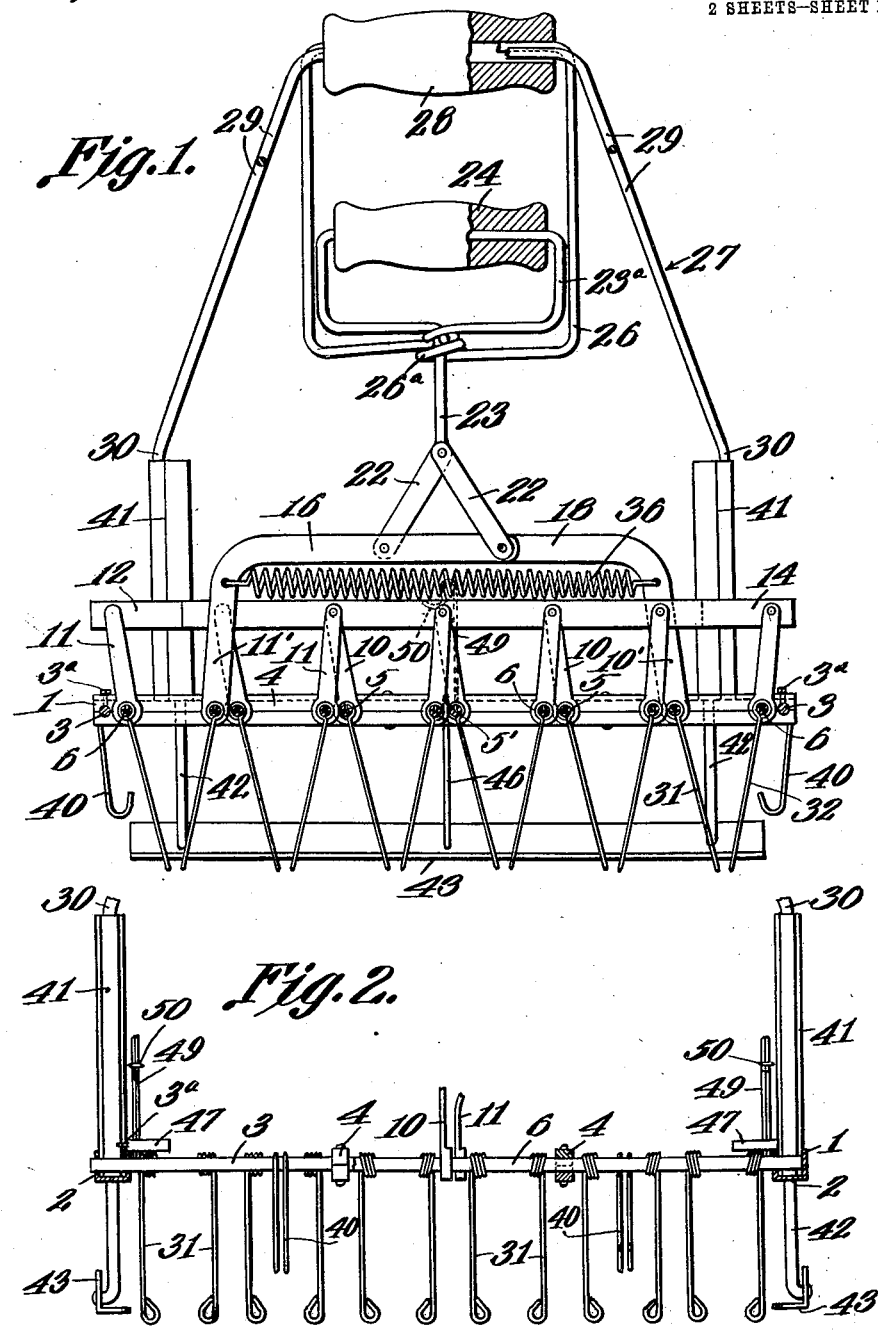

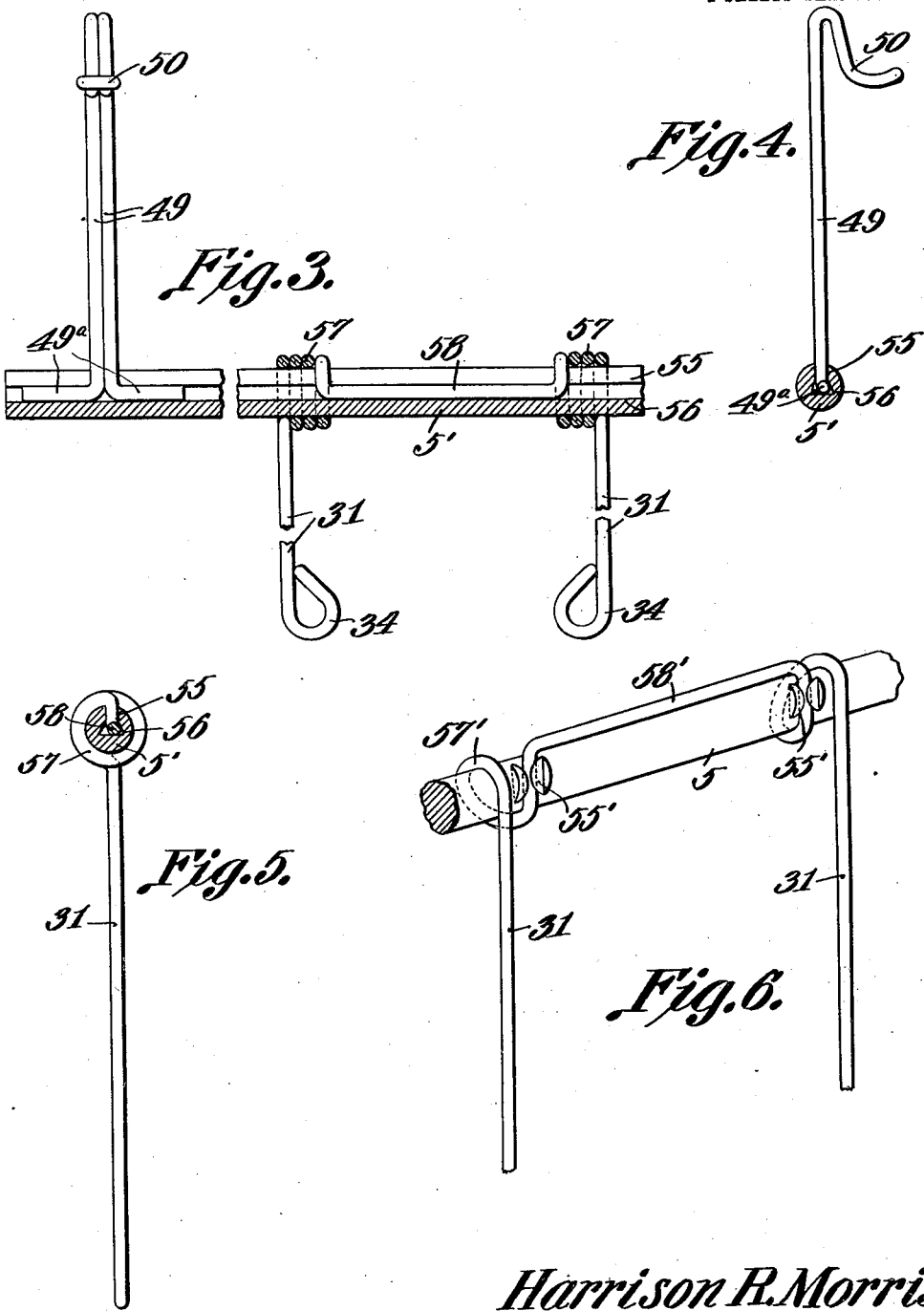

UNITED STATES PATENT OFFICE.

HARRISON R. MORRIS, OF MAPLETON, KANSAS.

EGG-HANDLER.

1,086,202.

Specification of Letters Patent. Patented Feb. 3, 1914.

Application filed February 21, 1913. Serial No. 749,979.

*To all whom it may concern:*

Be it known that I, HARRISON R. MORRIS, a citizen of the United States, residing at Mapleton, in the county of Bourbon and State of Kansas, have invented a new and useful Egg-Handler, of which the following is a specification.

The present invention appertains to egg handlers, and is particularly a refinement or improvement of the egg handler disclosed in my former Patent No. 978,049 issued December 6, 1910.

It is the object of the present invention to provide several valuable and material improvements in an egg handler, of the character indicated, or to generally improve the construction of devices of that character to which the present invention relates, as well as enhancing the utility thereof.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The improved device is illustrated in the accompanying drawings, wherein similar reference characters have been employed to denote corresponding parts, and wherein:—

Figure 1 is an elevation of the egg handler, parts being broken away and shown in section. Fig. 2 is a fragmental view thereof. Fig. 3 is a fragmental section of one of the shafts disclosing the means for attaching the egg holding members or fingers and locking member or finger thereto. Fig. 4 is an end view of the shaft illustrated in Fig. 3 showing the locking finger attached thereto. Fig. 5 is a sectional view taken through the shaft between a pair of the egg holding fingers. Fig. 6 is a fragmental perspective showing another manner of securing the egg holding fingers to the shaft.

The present invention in its primitive or general conception, resembles the egg handler disclosed in the above mentioned patent, but contains a number of valuable or material improvements, and for the purpose of convenience in referring to the said patent, the reference characters employed in the drawings have been made to correspond with the reference numerals of the said patent as much as possible.

The present improved construction includes the main frame 1 embodying the channel iron sills 2 and a pair of cross rods 3 passing through the ends of the flanges of the sills. Retaining screws 3ª are engaged to the cross rods 3 between the flanges of the sills 2 and preferably contact with the inner flanges so as to lock the sills upon the ends of the cross rods. The cross rods 3 are connected by a pair of beams 4, which together with the sills provide suitable bearings for the shafts 5 and 6, the beams 4 being split longitudinally and the parts thereof being secured together over the shafts and cross rods 3. The shafts 5 and 6 are terminally journaled through the inner flanges of the sills and abut against the outer flanges so that the shafts are properly constrained for rotation or rocking movements without longitudinal play, the intermediate portions of the shafts being braced or supported by the beams 3.

Each of the shafts 5 and 6 is solid or unbroken, and to central or intermediate points of the respective shafts 5 and 6, there are secured the upstanding arms 10 and 11, the arms having collars embracing the shafts and secured thereto in any suitable manner. The upper ends of the arms 10 are pivotally connected to a horizontal bar 12 while the upper ends of the arms 11 are pivotally connected to a horizontal bar 14. The bars 12 and 14 are disposed side by side, the arms 10 and 11 being of equal length, so that the arms of the respective series or sets may swing past each other. One of the arms 11, distinguished by a prime mark or denoted by the numeral 11', is extended or projects above the bar 14 and is bent angularly as at 16, to extend in a parallel position above the bar 14, whereas one of the arms 10, distinguished by a prime mark, or designated 10', also projects above the bar 12 and is bent angularly, as at 18 similar to the angular portion 16. The ends of the angular portions 16 and 18 overlap and have pivotally connected thereto, a pair of links 22 which converge upwardly and are pivoted to a vertical actuating rod 23. The angular or overhanging portions 16 and 18 provide actuating levers which are linked to the actuating rod 23 in order that when the rod is raised, the respective shafts 5 and 6 will be rocked in opposite directions.

The actuating or plunger rod 23 has its upper end bent into a rectangular loop 23ª and a hand grip 24 is engaged by the loop 23ª. The plunger rod 23 is guided through an eye 26ª formed at the intermediate portion of a pendant yoke 26 suspended from a carrying frame 27 including a hand grip 28 to the ends of which, the ends of the yoke 26 are engaged. The carrying or manipulating frame 27 embodies a pair of bail-like rods 29 engaged to the hand grip 28 and having their ends secured within the respective sills 3 to form corner standards 30.

To each of the shafts, there are secured a plurality of egg holding or egg engaging elements, each consisting of a pair of fingers. The fingers attached to the shaft 5 have been designated by the numeral 31, while the fingers attached to the shaft 6 have been designated by the numeral 32, although the fingers of the respective pairs of shafts are duplicates and the description of one will suffice for all.

In order to normally hold the respective egg holding elements in downwardly converging positions, a coiled wire retractile spring 36 is disposed between the bars 12 and 14 and the angular portions 16 and 18 and has its terminals engaged to the respective arms 10′ and 11′. Thus, the tension of the spring 36 will tend to swing the respective arms 10 and 11 in opposite directions so as to rock the respective sets of shafts in opposite directions to properly position the egg holding members or fingers. The loop 23ª normally seats on the intermediate portion of the yoke 26 to limit the swinging movements of the levers 16 and 18, it being noted that the loop 23 is disposed within the yoke 26.

Spring fingers 40 depend from the frame 1, the said fingers preferably extending over the cross rods 3 and being secured to the endmost shafts 5 and 6.

To each of the corner standards or posts 30 there is secured an upright casing 41, in which casings rods 42 reciprocate vertically. The rods 42 are spring pressed downwardly by means of springs inclosed or housed within the casings 41, which need not be illustrated as the same are old as disclosed in the above mentioned patent. The rods 42 pass slidably through the sills 2 and to the lower ends of each pair of the rods 42, there is secured an angle iron member 43. The members 43 may be termed, for convenience, ejectors, or they may be said to constitute an ejector frame.

To the intermediate portion of each ejector member 43, there is secured an upstanding stem 46, which is slidable through the respective sills 2 and which has its upper end bent angularly or inwardly as denoted by the numeral 47. The shaft 5 distinguished by the prime mark, or designated 5′, has a locking finger 49 attached thereto adjoining each end, the fingers 49 having their upper ends formed into hooks or seats 50 upon which the angular ends or portions 47 are adapted to rest under certain conditions as will hereinafter appear.

Each of the shafts 5 and 6 is provided with a longitudinal groove or featherway 55, the bottom of which is slightly dovetailed or undercut as denoted by the numeral 56. In Figs. 3, 4 and 5, the shaft 5′ has been illustrated, although a description thereof will suffice for the other shafts as well. As seen in Figs. 3 and 5, each of the egg holding members comprises a pair of fingers 31, having their lower or free ends bent into eyes or heads 34 and having their inner ends bent into coils 57, the inner ends of the coils being connected by a yoke 58 which is offset inwardly or axially so as to engage in the groove or featherway of the shaft. It will thus be noted that each of the egg holding elements may be bent or fashioned from a length of wire, the yoke 58 engaging the groove or featherway of the shaft to constrain the fingers from rotating or swinging around the shaft, the coils 57 permitting the fingers to yield or spring as necessary, and at the same time embracing the shaft to hold the fingers in position.

As depicted in Figs. 4 and 3, it will be observed that the locking finger 49 is bent from a length of wire, doubled and having its bight or bend formed into the hook or seat 50, the ends 49ª being bent angularly in opposite directions to engage in the groove of the shaft. The ends 49ª are adapted to lock within the undercut or dovetailed portion 56 of the groove so as to constrain the finger 49 against lateral displacement.

In Fig. 6, there is disclosed another means for securing the fingers 31 to the shaft, the fingers 31 having their inner ends bent into coils 57′ and the coils being connected by a yoke 58′. To secure the fingers 31 in position, lips or ears 55′ are struck or punched from the shaft so as to engage those portions of the wire between the yoke and the coils, which will serve to position the fingers, the coils 57′ permitting the fingers to flex or spring as necessary.

In use, when the ejector members 43 are raised, they may be normally held in such position by means of the locking fingers 49, the hooks or seats 50 of which engage under the angular ends 47 of the members or followers 46 secured to the ejector members 43. The egg holding elements or fingers thus protrude or depend below the ejector members 43 and may be readily inserted or projected into the cells of an ordinary egg rack. The insertion of the fingers into the egg rack will cause the holding fingers 40 to engage the rack. If the handle or grip 24 is grasped, together with the handle or grip 28, thus pulling the plunger rod upwardly, the arms 12 and 14 will be moved in opposite directions, so as to rock the shafts 5 and 6 in opposite directions, which will separate the respective egg holding elements or fingers 31 and 32, so that the eggs may pass between them. Then when the handle 24 is released, the spring 36 will cause the fingers 31 and 32 to grip the eggs, and inasmuch as the holding fingers 40 engage the rack and the fingers 31 and 32 engage the eggs, the rack and eggs may be lifted out of the crate or other container in which the eggs are commonly stored and shipped. The angular ends 27 of the followers 26 engaging the hooks 50 of the fingers 49 permit the shafts to rock without liberating the ejector members 43, so that the fingers 31 and 32 may be opened and closed without causing a depression of the members 43. After the eggs and rack have been lifted from the crate, they may be deposited in another crate or on a candler.

When it is desired to remove the eggs from a crate without removing the rack, the fingers 31 and 32 are inserted into the cells of the rack, the ejector members 43 being free and being seated on the upper edges of the rack, so that as the fingers are depressed, the ejector members will be brought under tension. The members 23 being seated on the rack, and the main frame 1 of the device being depressed by means of the handle 28, will cause the ends 47 of the followers 46 to be brought into coöperation with the hooks or seats 50. Then, if the handle 24 is raised slightly, the angular ends 47 may pass the hooks 50, the fingers 31 and 32 being opened at the same time to engage the eggs, and after the handle 24 is released, the fingers 31 and 32 are brought under tension by the spring 36 to hold the eggs. As the frame 1 is lifted, the members 43 will be depressed therefrom so as to prevent the rack from being lifted with the eggs, and as a consequence, the egg rack will remain in position within the crate. It is to be noted that when the rack has been lifted from the crate with the eggs, the ejector members will be locked in raised positions, so that when the rack and eggs are again to be deposited in the tray, the handle 24 may be raised sufficiently so as to simultaneously liberate the eggs and rack.

The device, as a whole, is adapted to conveniently manipulate or handle the eggs, and the improvements embodied therein are of a valuable and material nature and will be distinguished by the appended claims. The advantages of the improvements are many, and will be apparent to those versed in the art.

What is claimed is:—

1. In an egg handler, a frame, a plurality of shafts carried thereby, each shaft having a longitudinal groove, a plurality of egg holding elements carried by the shafts, means for actuating the shafts, each egg holding element being bent from a wire to form a pair of coils to embrace the shaft, an axial yoke connecting the coils to engage the groove, and fingers attached to the coils.

2. In an egg handler, a frame, a plurality of shafts carried thereby, each shaft having a longitudinal groove, a plurality of egg holding elements carried by the shafts, means for actuating the shafts, each egg holding element embodying a pair of fingers having means at their inner ends to embrace the shaft and a connecting member engageable in the groove of the shaft.

3. In an egg handler, a frame, a plurality of grooved shafts carried thereby, means for actuating the shafts and a plurality of egg holding elements carried by the shafts, each element embodying a finger having a coil at its inner end to embrace the shaft and a member projecting from the coil to engage within the groove of the shaft.

4. In an egg handler, a main frame, a plurality of shafts carried thereby and having grooves therein, an ejector yieldingly suspended from the frame, means for actuating the shafts, egg holding elements carried by the shafts, each comprising a pair of fingers having coils at their inner ends to embrace the shaft and a yoke connecting the coils to engage in the groove of the shaft, a member secured to the ejector, and having an angular portion and a locking finger bent from a wire doubled and having its bight bent to engage under the angular portion of the said member, and having its ends bent angularly in opposite directions to engage in the groove of one shaft.

In testimony that I claim the foregoing as my own, I have hereto affixed my signature in the presence of two witnesses.

HARRISON R. MORRIS.

Witnesses:
 ORVAN M. HISSONG,
 NETTIE AMER.